United States Patent
Ponsford et al.

(10) Patent No.: US 12,242,716 B2
(45) Date of Patent: Mar. 4, 2025

(54) AUTOMATIONS FOR MUSIC EDITING AND PLAYBACK

(71) Applicant: MULTITRACKS.COM, LLC, Cedar Park, TX (US)

(72) Inventors: Kristian Ponsford, Cedar Park, TX (US); Matt Bell, Cedar Park, TX (US); Marc Bonasso, Cedar Park, TX (US)

(73) Assignee: MULTITRACKS.COM, LLC, Cedar Park, TX (US)

( * ) Notice: Subject to any disclaimer, the term of this patent is extended or adjusted under 35 U.S.C. 154(b) by 0 days.

(21) Appl. No.: 18/646,635

(22) Filed: Apr. 25, 2024

(65) Prior Publication Data

US 2024/0361899 A1   Oct. 31, 2024

Related U.S. Application Data

(60) Provisional application No. 63/461,763, filed on Apr. 25, 2023.

(51) Int. Cl.
*G06F 3/04847* (2022.01)
*G11B 27/031* (2006.01)
*G11B 27/34* (2006.01)

(52) U.S. Cl.
CPC ........ *G06F 3/04847* (2013.01); *G11B 27/031* (2013.01); *G11B 27/34* (2013.01)

(58) Field of Classification Search
None
See application file for complete search history.

(56) References Cited

U.S. PATENT DOCUMENTS

| | | | | |
|---|---|---|---|---|
| 11,544,322 | B2 * | 1/2023 | Dontcheva | G06F 3/0484 |
| 2017/0301372 | A1 * | 10/2017 | Jehan | G06F 16/635 |
| 2020/0272659 | A1 * | 8/2020 | Pachet | H04N 21/854 |
| 2020/0334290 | A1 * | 10/2020 | Dontcheva | G06F 16/738 |
| 2021/0158086 | A1 * | 5/2021 | Salamon | G10L 25/51 |
| 2021/0383781 | A1 * | 12/2021 | Moyer | G10H 1/0058 |

(Continued)

OTHER PUBLICATIONS

"How to use PLAYBACK by Multitracks" by JAMusic, published on Mar. 13, 2020 (Year: 2020).*

(Continued)

*Primary Examiner* — Tuyetlien T Tran
(74) *Attorney, Agent, or Firm* — DICKINSON WRIGHT PLLC

(57) ABSTRACT

Systems and methods for automating track adjustments for live music performance. The method includes displaying a graphical user interface for music editing and playback. The graphical user interface includes a timeline waveform of a song and control elements configured to control tracks in the song. The method also includes receiving a timecode in the timeline waveform. The method further includes receiving a transition length indicating a number of beats. The method also includes receiving, from one of the control elements, a target value for one of the tracks. The method further includes determining a transition rate based on the transition length and a difference between the target value and a current value for one of the tracks. Upon reaching the timecode during playback of the song, the method includes automatically adjusting the one of the tracks from the current value to the target value based on the transition rate.

23 Claims, 15 Drawing Sheets

(56) References Cited

U.S. PATENT DOCUMENTS

| | | | |
|---|---|---|---|
| 2022/0206738 A1* | 6/2022 | Anvaripour | G11B 27/031 |
| 2022/0398063 A1* | 12/2022 | Dumas | G10H 1/0008 |
| 2024/0021216 A1* | 1/2024 | Briand | G11B 27/005 |
| 2024/0135908 A1* | 4/2024 | Skinner | G10H 1/0025 |

OTHER PUBLICATIONS

"Multitracks Playback automate MIDI—iPad" by Travis Short, published on Oct. 19, 2021 (Year: 2021).*

* cited by examiner

AUTOMATIONS FOR MUSIC EDITING AND PLAYBACK

CROSS-REFERENCE TO RELATED APPLICATIONS

This application claims priority to and the benefit of U.S. Provisional Application Ser. No. 63/461,763 filed Apr. 25, 2023, titled "AUTOMATIONS FOR EDITING AND PLAYBACK," the entire disclosure of which is hereby incorporated by reference for all purposes.

BACKGROUND

During services and other public events, churches and other religious institutions often sing and/or play music. In addition, churches may stream music over the Internet. Further, to enable participants to follow along, churches may project, stream, or print lyrics of songs. Prior to a service, a service leader or music director may add songs (or masters) that will be sung, played, and/or streamed during the service to a setlist. In order to account for the specific environment of the service, changes may be needed to individual tracks of the multitracks of the songs in the setlist. For example, the piano tracks of some songs in the setlist may need to be muted because a live piano will be played during the service. Further, in order to fit in with the specific arrangement of the service, changes may be needed to the structures of some of the songs in the setlist. For example, a soft bridge section may be added after an impactful verse section of a song in order to provide the congregation with some time for private reflection.

SUMMARY

Current music editing and playback systems allow users to adjust a mix to their liking on a global level for an entire song. For example, a user can set the fader level of an acoustic guitar track to 100% during a first song and then mute the acoustic guitar track during a second song. However, current systems are limited in that they do not allow users to make granular edits to a mix. For example, a user may want a piano track playing just during a bridge section of a song or the user may want the piano track playing just during a chorus of the song. Current systems also do not smooth rough transitions that can be created when sections are added to or removed from a song. For example, when a loud bridge section is added after a soft verse the congregation to hear. Thus, systems and methods for adjusting parameters within specific portions of songs during playback is needed.

Various examples of the present disclosure are directed to systems and methods of adjusting parameters in different portions of a song. More particularly, various examples of the present disclosure are directed to systems and methods that use automations to adjust song parameters at specific points within a song. For example, a user places an automation (or automation point) at any position in the timeline waveform of a song and sets the transition length of the automation. The transition can occur instantly or over a user-defined number of beats. The user then adjusts one or more parameters of the song. The music editing and playback system of the present disclosure sets the timecode(s) of the automation based on the position in the timeline waveform where the user placed the automation. Further, for automations with multi-beat transitions, the music editing and playback system of the present disclosure automatically determines the rates at which each adjusted parameter changes from its original value to its adjusted value so that the changes occur smoothly over the user-defined numbers of beats.

The present disclosure provides a method for automating track adjustments for live music performance. The method includes displaying a graphical user interface for music editing and playback. The graphical user interface includes a timeline waveform of a song including a plurality of tracks. The graphical user interface further includes a plurality of control elements configured to control the plurality of tracks in the song. The method also includes receiving, via the graphical user interface, a timecode for an automation in the timeline waveform. The method further includes receiving, via the graphical user interface, a transition length indicating a number of beats for the automation. The method also includes receiving, from one of the plurality of control elements, a target value for one of the plurality of tracks in the song. The method further includes determining a transition rate based on the transition length and a difference between the target value and a current value for the one of the plurality of tracks in the song. Upon reaching the timecode during playback of the song, the method includes executing the automation by automatically adjusting the one of the plurality of tracks in the song from the current value to the target value based on the transition rate.

The present disclosure also provides a system for automating track adjustments for live music performance. The system includes, in one implementation, a display device, one or more memory devices, and one or more processing devices. The display device is configured to display a graphical user interface for music editing and playback. The graphical user interface includes a timeline waveform of a song including a plurality of tracks. The graphical user interface also includes a plurality of control elements configured to control the plurality of tracks in the song. The one or more memory devices store instructions. The one or more processing devices are configured to execute the instructions to receive, via the graphical user interface, a timecode for an automation in the timeline waveform. The one or more processing devices are also configured to execute the instructions to receive, via the graphical user interface, a transition length indicating a number of beats for the automation. The one or more processing devices are further configured to execute the instructions to receive, from one of the plurality of control elements, a target value for one of the plurality of tracks in the song. The one or more processing devices are also configured to execute the instructions to determine a transition rate based on the transition length and a difference between the target value and a current value for the one of the plurality of tracks in the song. Upon reaching the timecode during playback of the song, the one or more processing devices are configured to execute the instructions to execute the automation by automatically adjusting the one of the plurality of tracks in the song from the current value to the target value based on the transition rate.

The present disclosure further provides a system for automating track adjustments for live music performance. The system includes in one implementation, a display device, one or more memory elements, and one or more processors. The display device is configured to display a graphical user interface for music editing and playback. The graphical user interface includes a timeline waveform of a song including at least a first track and a second track. The graphical user interface also includes a first control element configured to control the first track in the song. The graphical user interface further includes a second control element configured to control the second track in the song. The one or more memory devices store instructions. The one or more processing devices are configured to execute the instructions to receive, via the graphical user interface, a timecode for an automation in the timeline waveform. The one or more processing devices are also configured to execute the instructions to receive, via the graphical user interface, a transition length indicating a number of beats for the automation. The one or more processing devices are further configured to execute the instructions to receive, from the first control element, a first target value for a first transition of the first track in the song. The one or more processing devices are also configured to execute the instructions to receive, from the second control element, a second target value for a second transition of the second track in the song. The one or more processing devices are further configured to execute the instructions to determine a first transition rate based on the transition length and a first difference between the first target value and a first current value for the first track in the song. The one or more processing devices are also configured to execute the instructions to determining a second transition rate based on the transition length and a second difference between the second target value and a second current value for the second track in the song. Upon reaching the timecode during playback of the song, the one or more processing devices are configured to execute the instructions to execute the automation by automatically adjusting the first track in the song from the first current value to the first target value based on the first transition rate. The one or more processing devices are also configured to execute the instructions to execute the automation by automatically adjusting the second track in the song from the second current value to the second target value based on the second transition rate.

Other technical features may be readily apparent to one skilled in the art from the following figures and descriptions.

BRIEF DESCRIPTION OF THE DRAWINGS

For a more complete understanding of the present disclosure and its advantages, reference is now made to the following description, taken in conjunction with the accompanying drawings. It is emphasized that, according to common practice, the various features of the drawings are not necessarily to-scale. On the contrary, the dimensions of the various features may be—and typically are—arbitrarily expanded or reduced for the purpose of clarity.

NOTATION AND NOMENCLATURE

Figure 1A:
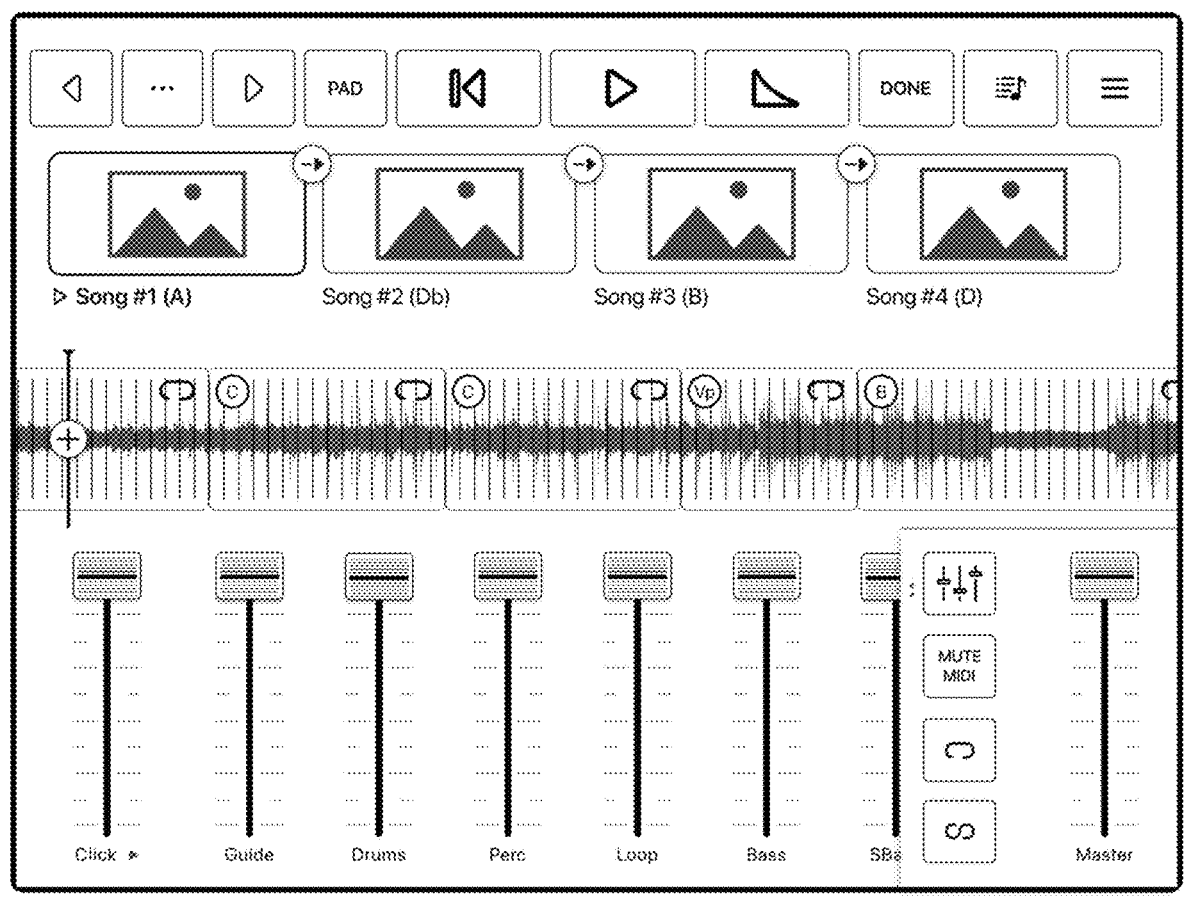
FIG. 1A is a screen shot of an example of a user interface for editing a setlist, in accordance with some implementations of the present disclosure.

Various terms are used to refer to particular system components. A particular component may be referred to commercially or otherwise by different names. Further, a particular component (or the same or similar component) may be referred to commercially or otherwise by different names. Consistent with this, nothing in the present disclosure shall be deemed to distinguish between components that differ only in name but not in function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The terminology used herein is for the purpose of describing particular example implementations only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example implementations. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "up," "upper," "top," "bottom," "down," "inside," "outside," "contained within," "superimposing upon," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

DETAILED DESCRIPTION

The following discussion is directed to various implementations of the present disclosure. Although one or more of these implementations may be preferred, the implementations disclosed should not be interpreted, or otherwise used, as limiting the scope of the present disclosure. In addition, one skilled in the art will understand that the following description has broad application, and the discussion of any implementation is meant only to be exemplary of that implementation, and not intended to intimate that the scope of the disclosure is limited to that implementation.

To sing, play, and/or stream songs during a public performance, users add songs (or masters) to a setlist in a music editing and playback system. FIG. 1A is a screen shot of an example of a user interface for editing a setlist. The top bar of the user interface illustrated in FIG. 1A includes a plurality of buttons for controlling, among other things, playback and editing of the setlist. Below the top bar is a visual representation of the order of songs included in the setlist. The user interface illustrated in FIG. 1A also includes a timeline waveform of the currently-selected song. For example, in FIG. 1A, Song #1 is currently-selected and the timeline waveform of Song #1 is displayed. Basic song structure comprises, for example, an intro, one or more verses, a chorus, and a bridge. The timeline waveform includes visual representations delineating and identifying different sections of the currently-selected song. For example, the timeline waveform in FIG. 1A indicates two chorus sections followed by a verse section and then a bridge section. The bottom portion of the user interface illustrated in FIG. 1A includes a plurality of volume faders that individually control tracks (or stems) of the songs. For example, the screen shot illustrated in FIG. 1A includes faders for, among other things, a click track, a guide track, and other instrumental tracks. The click track may include an audible metronome that musicians can use to stay in sync with a song. The guide track contains spoken pre-recorded vocals cues that help musicians identify where they are in the song. The click and guide tracks are generally only audible to the musicians and vocalists via an in-ear monitoring system. On the other hand, the instrumental tracks are generally audible to everyone on stage and the congregation. The screen shot illustrated in FIG. 1A includes faders for one example combination of different parameters that can be adjusted in a song. Other combinations are possible. A fader is one example of a "control element." Tracks of a song may also be controlled by knobs, buttons, or a combination thereof.

As described above, current systems only allow users to adjust a mix on a global level for an entire song. For example, a user may not want a bass track playing during a specific song because there will be a live bass playing. Thus, the user may turn the bass track off (i.e., mute the bass track) or fade the bass track down for that song. However, current systems are limited in that they do not allow users to make granular edits to a mix. For example, a user may want a piano track playing just during a bridge of a song or the user may want the piano track playing just during a chorus of the song. Thus, various examples of the present disclosure are directed to systems and methods of adjusting parameters in different portions of a song. More particularly, various examples of the present disclosure are directed to systems and methods that use automations to adjust song parameters at specific points within a song with the intent of live performance playback.

Figure 1B:
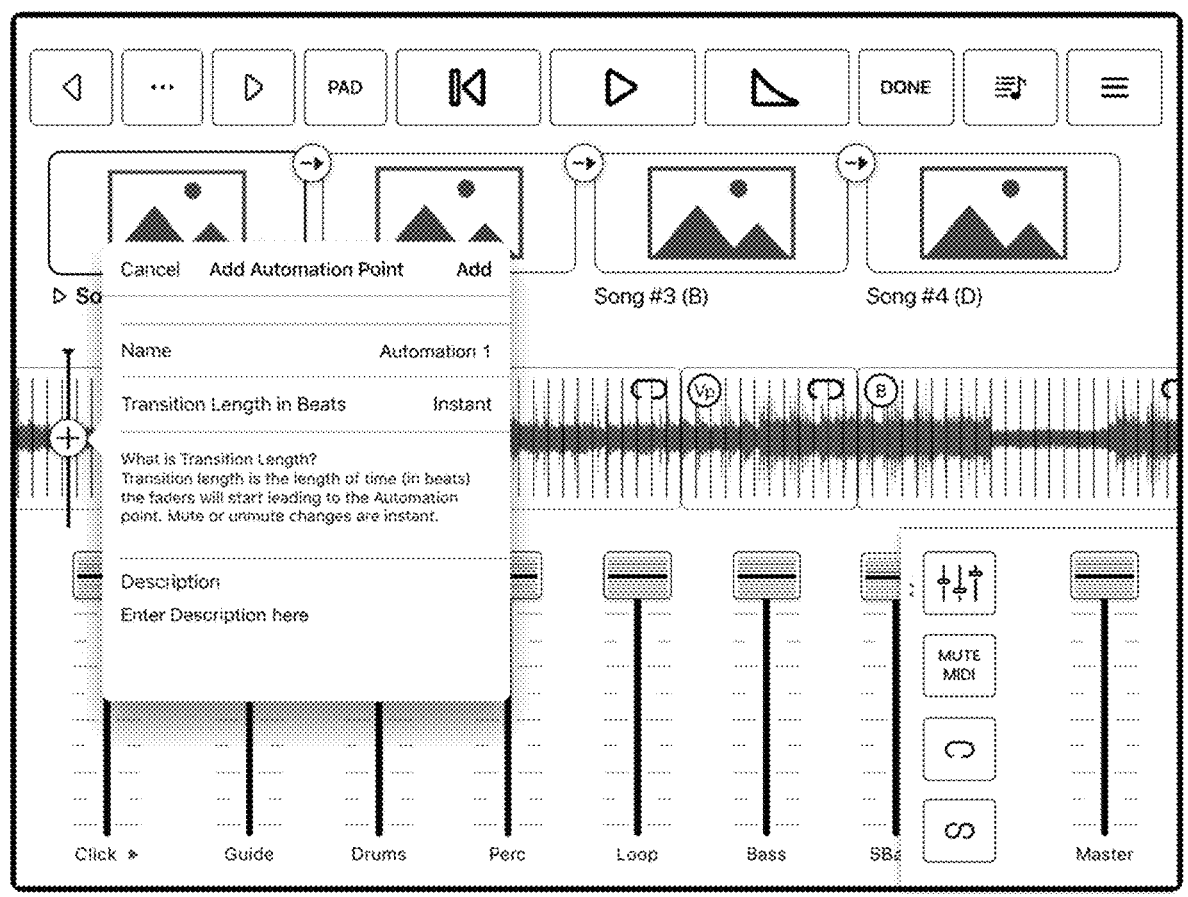
FIG. 1B is a screen shot of an example of a pop-up automation menu in which an automation with an instant transition is generated, in accordance with some implementations of the present disclosure.

To add an automation (or automation point) within a song, the user shifts the timeline waveform until the play head is positioned at the part of the song where the user wants the automation to occur. Then, the user clicks the plus button on the play head and a pop-up automation menu is displayed, as illustrated in FIG. 1B. Within the pop-up automation menu, the user can name the automation, adjust the transition length, and provide a written description of the automation. Providing a written description of the automation is helpful for the user to remember what the automation does. Further, when one user is creating an automation and then passing the setlist to a different user, providing a written description of the automation is really helpful so the different user can quickly understand what the automation does. In the example illustrated in FIG. 1B, the automation is named "Automation 1" and the transition is set to occur instantly.

Figure 1C:
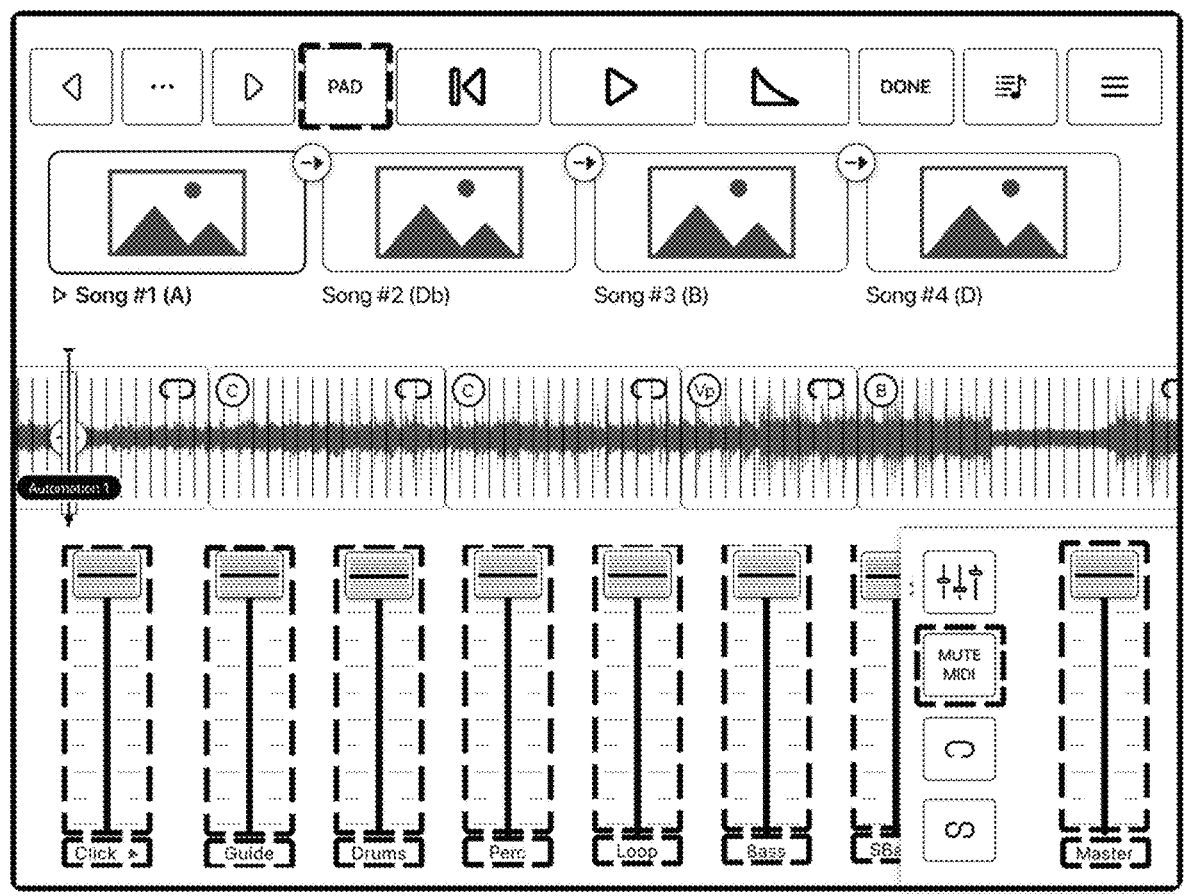
FIG. 1C is a screen shot of an example of a user interface for editing a setlist in which parameters that can be adjusted in an automation with an instant transition are highlighted, in accordance with some implementations of the present disclosure.
Figure 1D:
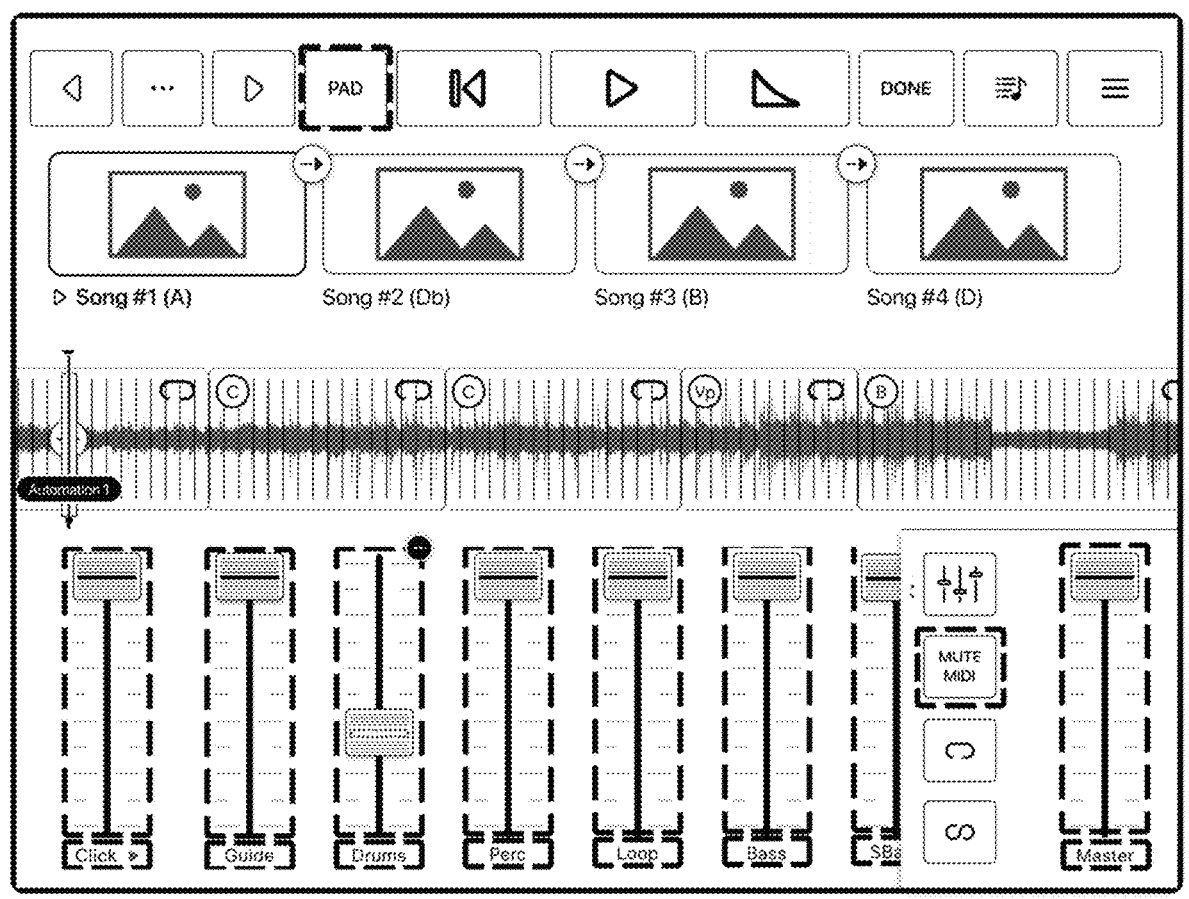
FIG. 1D is a screen shot of an example of a user interface for editing a setlist in which a single parameter has been adjusted in an automation with an instant transition, in accordance with some implementations of the present disclosure.

After adjusting the automation settings in the pop-up automation menu as needed, the user clicks the add button and user interface allows the user to adjust parameters of the song. Some parameters may not be adjustable for every song. For example, the electric guitar track fader may not be adjustable for a song that does not include an electric guitar track. Thus, in some implementations, the user interface provides a visual indication of each song parameter that can be adjusted. For example, in the screen shot of FIG. 1C, outlines are displayed around each song parameter that can be adjusted. The user then manipulates the song parameters as desired. For example, in the screen shot of FIG. 1D, the fader for the drums track is adjusted down. After making adjustments, the user clicks the done button to commit the adjustments. In some implementations, the committed adjustments are connected to the point on the timeline waveform where the play head is located. In alternate implementations, the committed adjustments for different parameters are connected to the stem or track of the parameters. For example, an adjustment to the drums track is connected to the drums track and an adjustment to bass track is connected to the bass track.

Figure 1E:
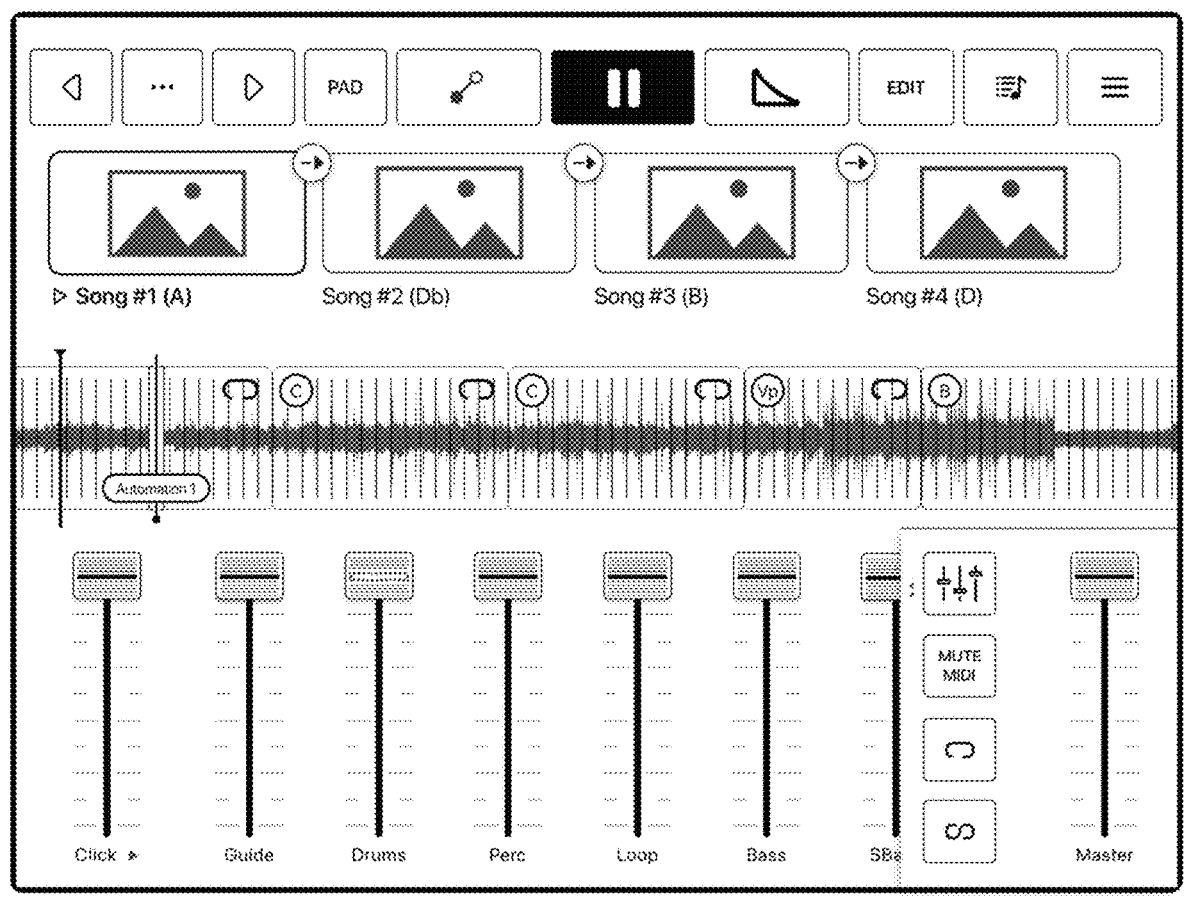
FIG. 1E is a screen shot of an example of a user interface during playback of a song before a timecode of an automation with an instant transition is reached, in accordance with some implementations of the present disclosure.
Figure 1F:
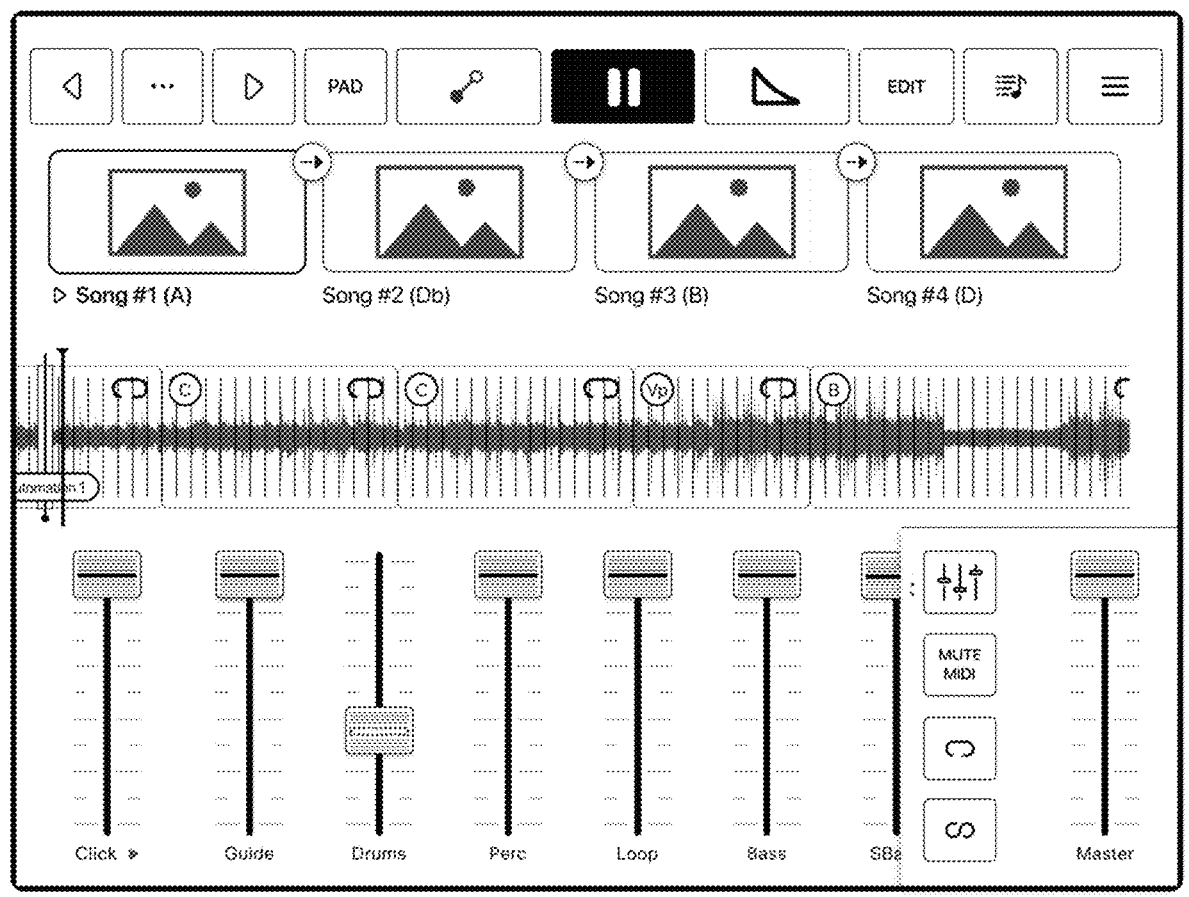
FIG. 1F is a screen shot of an example of a user interface during playback of a song after a timecode of an automation with an instant transition has been passed, in accordance with some implementations of the present disclosure.

After Automation 1 is saved, it executes during subsequent playback of the song. For example, FIG. 1E is a screen shot of the user interface during playback of Song #1 before the timecode of Automation 1 is reached. As illustrated in FIG. 1E, the fader for the drums track is located at its previous position. FIG. 1F is a screen shot of the user interface during playback of Song #1 after the timecode of Automation 1 has been passed. As illustrated in FIG. 1F, the fader for the drums track has moved to the new position set within Automation 1. In some implementations, the music editing and playback system holds song parameters to their newly-changed values until the end of the song, and/or the next automation.

Figure 2A:
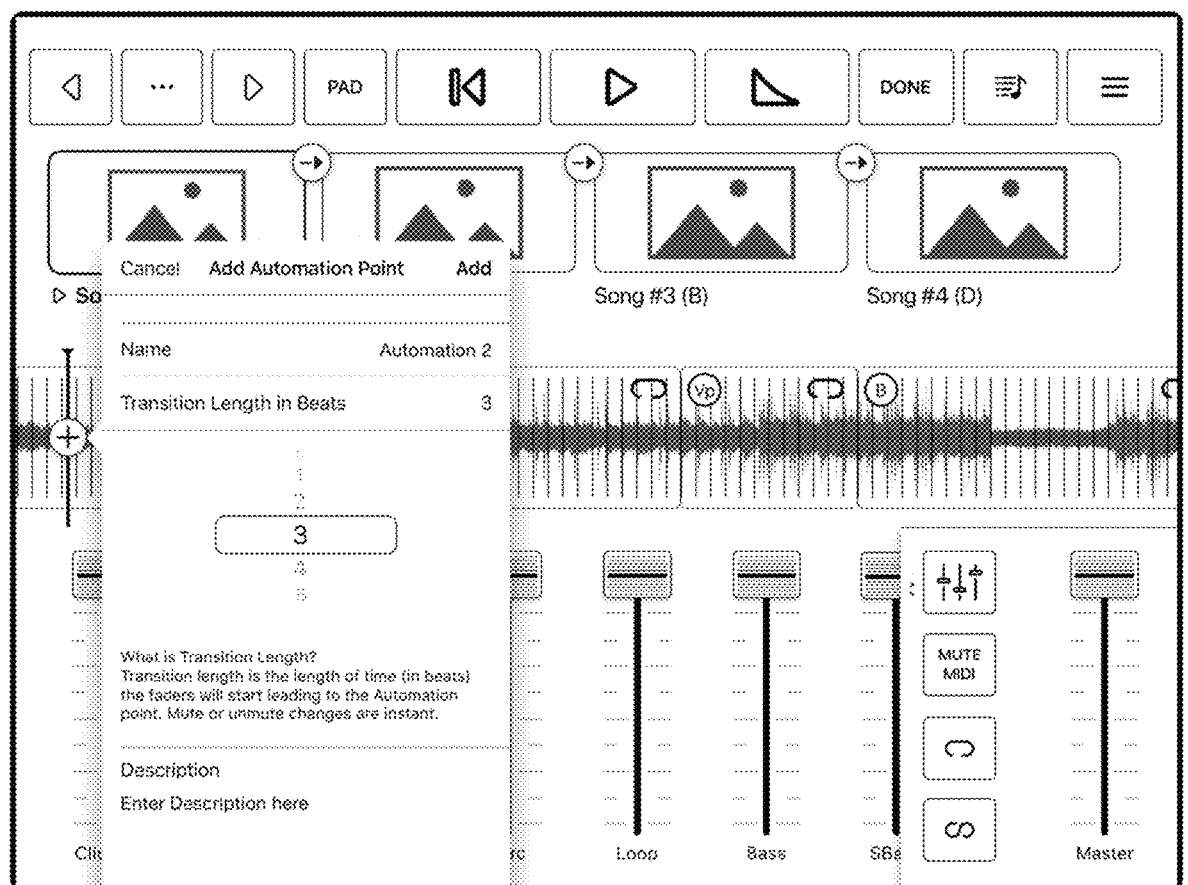
FIG. 2A is a screen shot of an example of a pop-up automation menu in which an automation with a multi-beat transition is generated, in accordance with some implementations of the present disclosure.
Figure 2B:
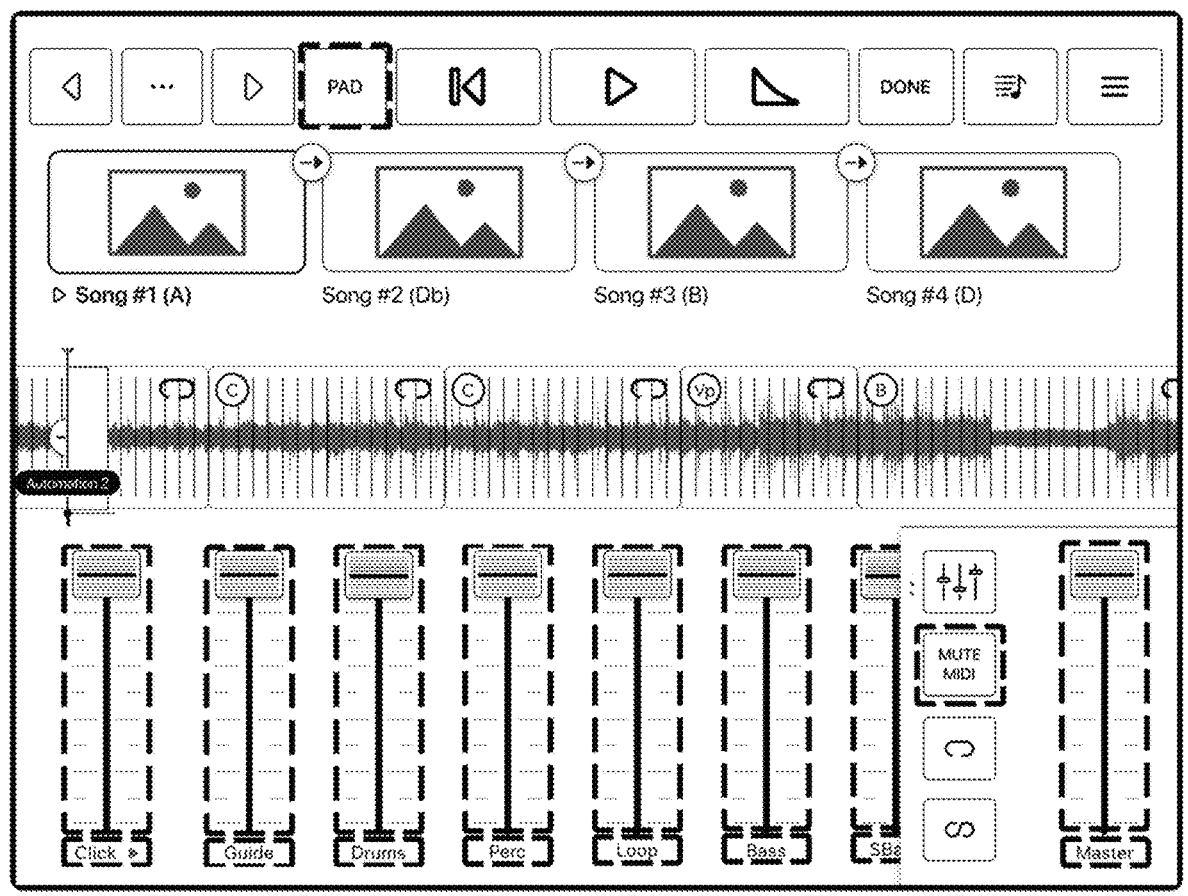
FIG. 2B is a screen shot of an example of a user interface for editing a setlist in which parameters that can be adjusted in an automation with a multi-beat transition are highlighted, in accordance with some implementations of the present disclosure.
Figure 2C:
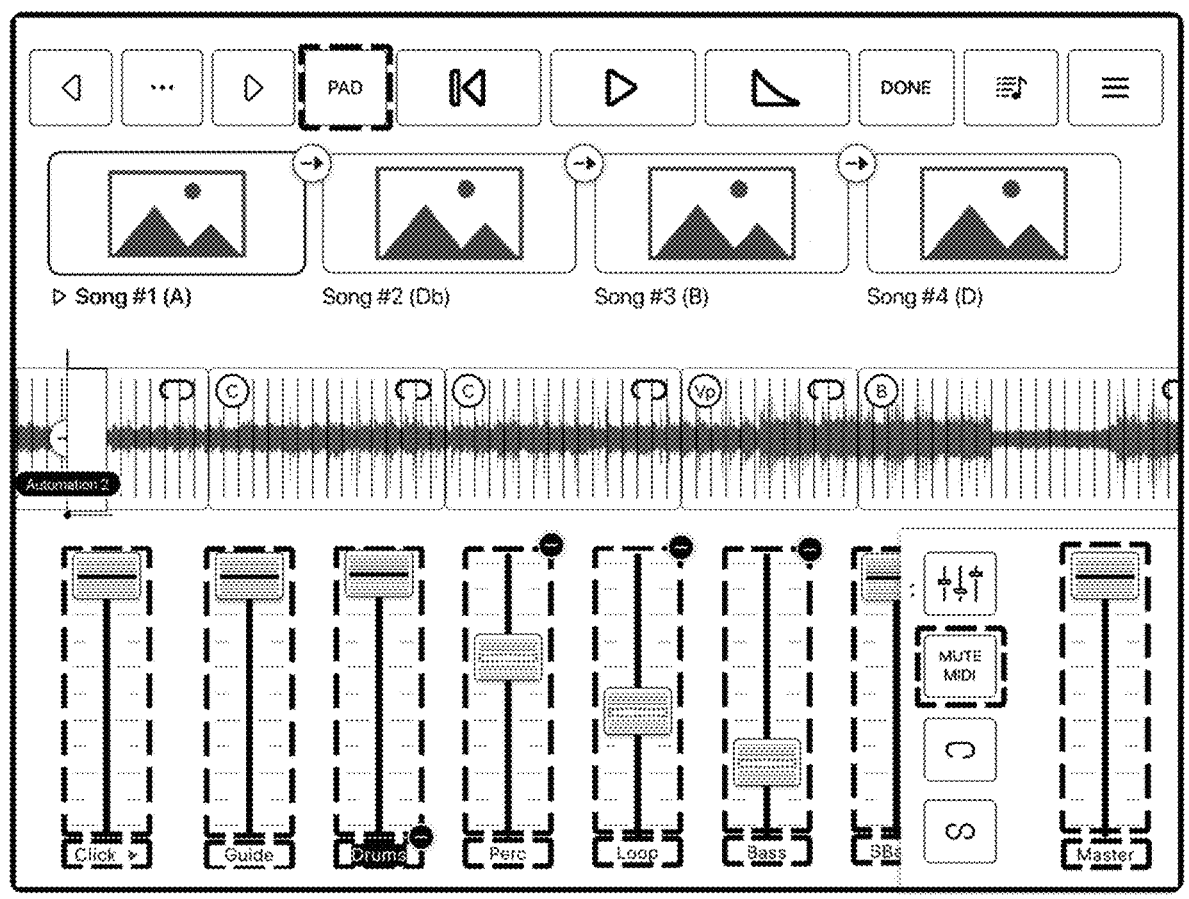
FIG. 2C is a screen shot of an example of a user interface for editing a setlist in which multiple parameters have been adjusted in an automation with a multi-beat transition, in accordance with some implementations of the present disclosure.

As described above, transitions within automations can occur instantly. In addition, transitions within automation can occur over a plurality of beats. FIG. 2A is a screen shot of the user interface during the creation of an automation point named "Automation 2." In the example illustrated in FIG. 2A, the transition length of Automation 2 is set to three beats. In addition to providing visual indications for every song parameter that can be adjusted, the user interface may also provide a visual representation of the transition length on the timeline waveform. For example, in FIG. 2B, a box is displayed on the timeline waveform to provide a visual indication that the transition length of Automation 2 is three beats. In the screen shot of FIG. 2C, the faders for the percussion, loop, and bass tracks are each adjusted. In addition, the drums track is muted in FIG. 2C.

Figure 2D:
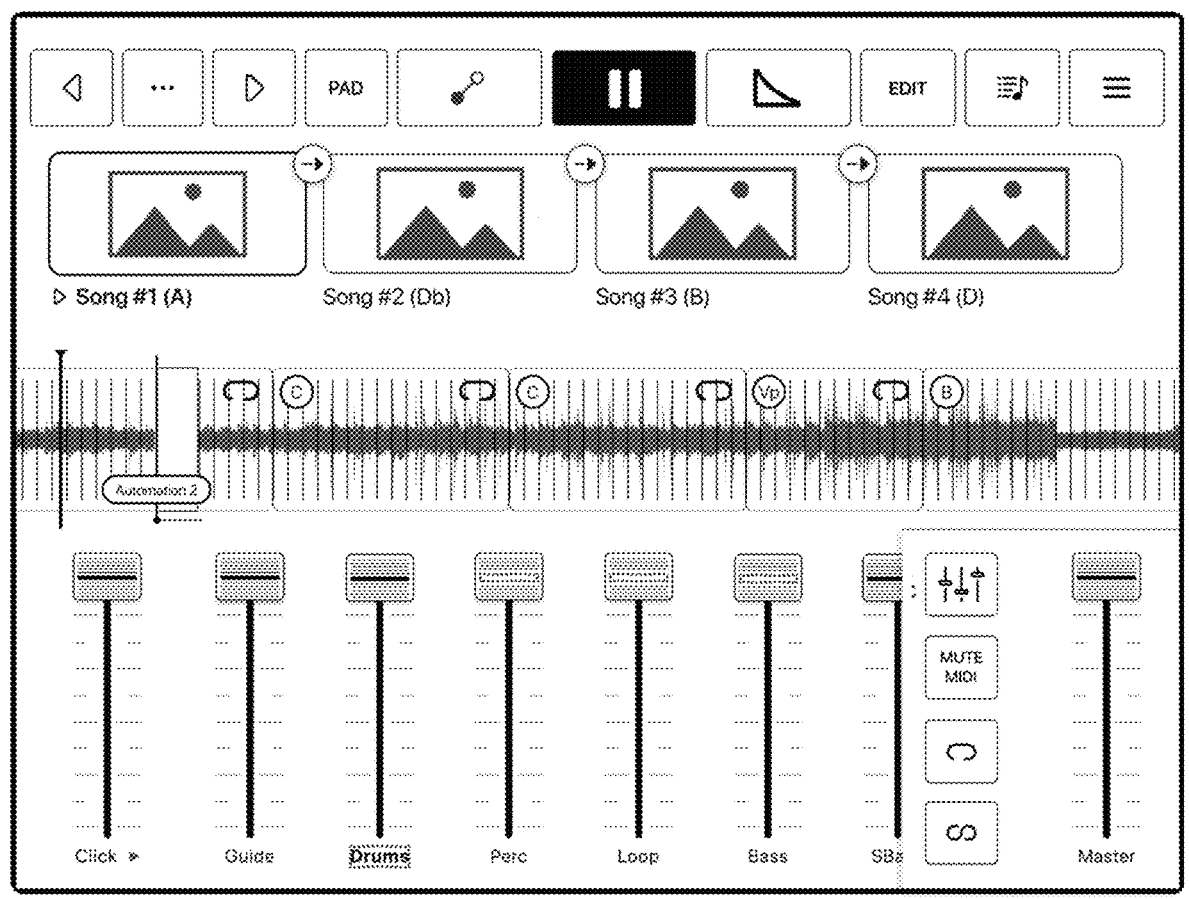
FIG. 2D is a screen shot of an example of a user interface during playback of a song before a timecode of a starting point of an automation with a multi-beat transition is reached, in accordance with some implementations of the present disclosure.
Figure 2E:
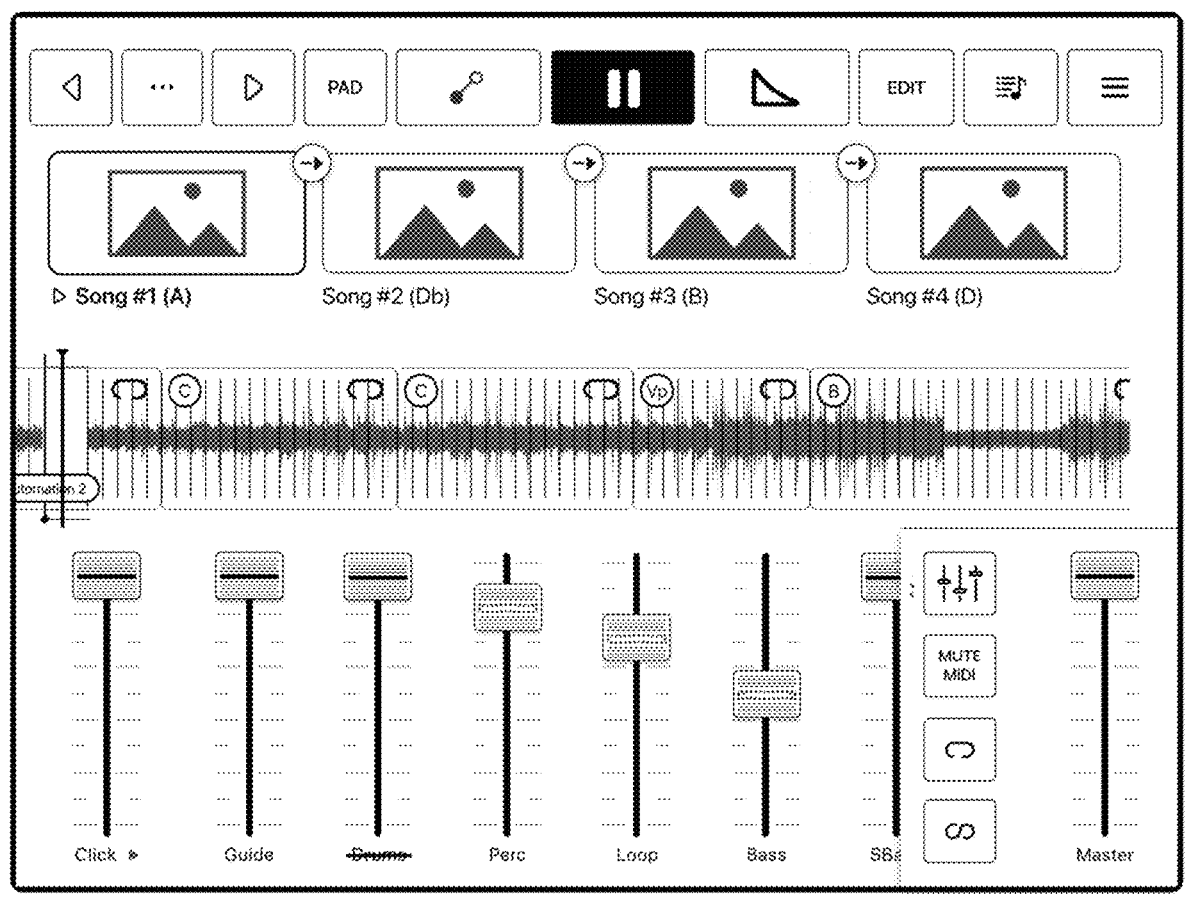
FIG. 2E is a screen shot of an example of a user interface during playback of a song and during a transition of an automation with a multi-beat transition, in accordance with some implementations of the present disclosure.
Figure 2F:
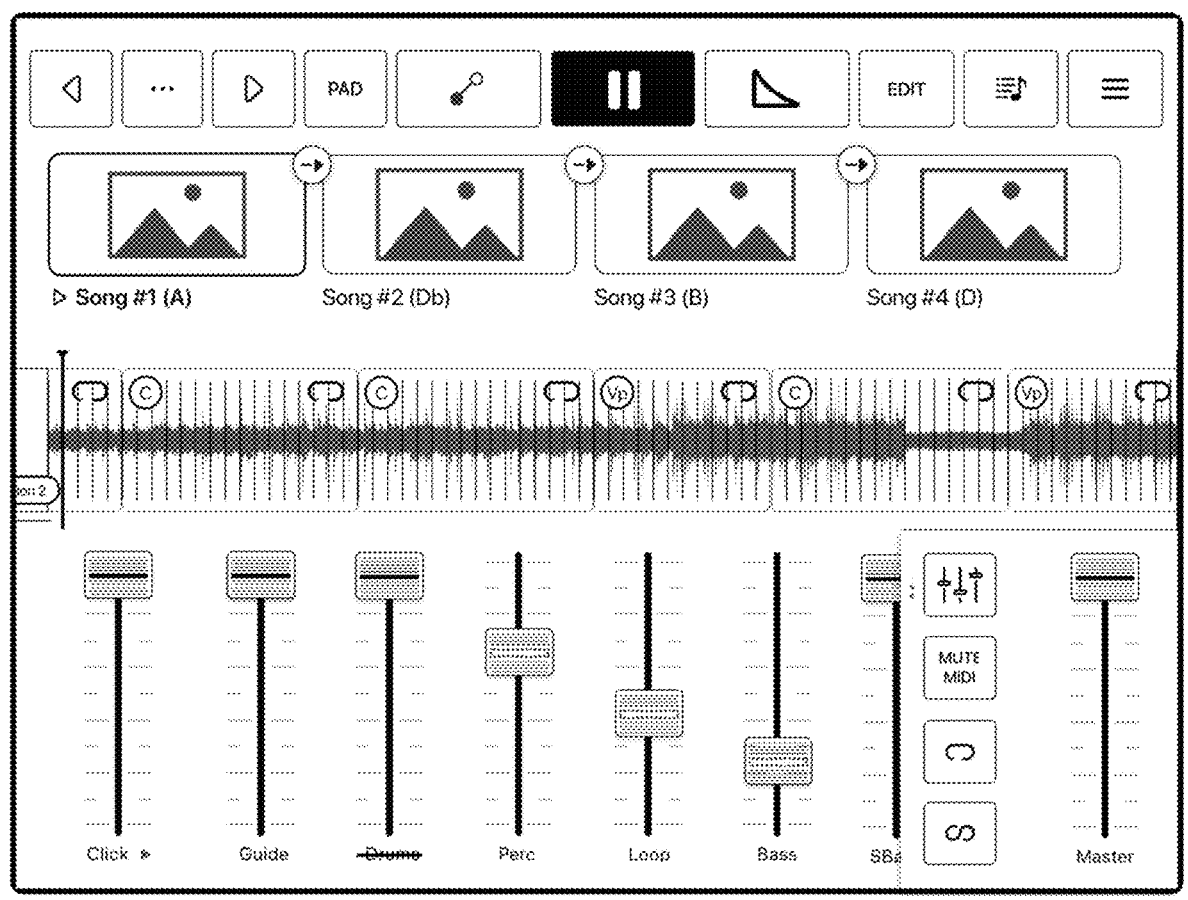
FIG. 2F is a screen shot of an example of a user interface during playback of a song after a timecode of an ending point of an automation with a multi-beat transition has been passed, in accordance with some implementations of the present disclosure.

After Automation 2 is saved, it executes during subsequent playback of the song. For example, FIG. 2D is a screen shot of the user interface during playback of Song #1 before the timecode of the starting point of Automation 2 is reached. As illustrated in FIG. 2D, the faders for the drums, percussion, loop, and bass tracks are located at their previous positions. FIG. 2E is a screen shot of the user interface during playback of Song #1 and during the transition length of Automation 2. As illustrated in FIG. 2E, the faders for the percussion, loop, and bass tracks are moving from their previous positions towards their new positions set within Automation 2. Muting of the drums track occurs instantly. FIG. 2F is a screen shot of the user interface during playback of Song #1 after the timecode of the ending point of Automation 2. As illustrated in FIG. 2F, the faders for the percussion, loop, and bass tracks have moved to the new positions set within Automation 2. In some implementations, the music editing and playback system stores automations with multi-beat transitions as a pair of two timecodes: a first timecode for the starting point and a second timecode for the ending point.

The music editing and playback system described herein alleviates the user from having to determine the timecodes for a transition. For example, after the user places an automation in the timeline waveform of a song, the music editing and playback system determines the timecode(s) for the automation based on the position in the timeline waveform where the user placed the automation. In some implementations, the music editing and playback system automatically sets the timecode(s) for automations to sync up with the beats of the song. For example, for an automation with an instant transition, the music editing and playback system may set the automation to occur at the timecode of the beat of the song that is closest to the location where the user placed the automation in the timeline waveform of the song. As a further example, for an automation with a six-beat transition, the music editing and playback system may set a starting point of the automation at the timecode of the beat of the song that is closest to the location where the user placed the automation, and set an ending point of the automation at the timecode of the beat that occurs six beats later.

To provide smooth transitions of the faders, the music editing and playback system is configured to determine rates to adjust the faders during the user-defined transition length so that each fader completes its transition at the end of the user-defined transition length. For example, in Automation 2, the fader for the percussion track changes from 100% to 82% in three beats. Thus, to achieve an 18% percent reduction in three beats, the music editing and playback system automatically lowers the percussion track by 6% for each beat within the transition length of Automation 2. As a further example, in Automation 2, the fader for the bass track changes from 100% to 49% in three beats. Thus, to achieve a 51% percent reduction in three beats, the music editing and playback system automatically lowers the bass track by 17% for each beat within the transition length of Automation 2. In some situations, some faders may be going down within an automation while other faders are going up within the same automation. In some situations, some faders may change by a small amount within an automation while other faders change by a large amount within the same automation. By determining timecodes for the starting and ending points and determining transition rates, the music editing and playback system allows a user to make complex changes without the user having to determine the timecodes for the transitions.

In some implementations, the music editing and playback system recognizes automations during a looping operation. For example, a user may add an automation to adjust a set of parameters for a chorus section of a song and set the chorus section to loop. When the chorus section is repeated, the set of parameters will stay at their adjusted values instead of jumping back to their previous values and then fading to their adjusted values.

Due the nature of leading worship and music for religious services, a user can make a decision for a mix while planning the service, but then in the moment of leading worship, the user may want to make a change in order to respond to the live music, the room, or the service. So, unlike a show where the user prerecords an entire automation point and delivers a show musical performance, the music editing and playback system allows users to make real-time changes that override the automations they previously made. For example, in a setlist with an automation where a piano track is muted during the bridge of a song, but on Sunday morning the user decides that they now want the piano to play during the bridge, the user can adjust the fader for the piano track and the music editing and playback system overrides the respective automation until the user resets it. In some implementations, the user interface produces a visual indicator to indicate when the user has overridden an automation. For example, in a setlist with an automation where an acoustic guitar track is adjusted, but during a live performance the user moves the fader for the acoustic guitar track, the fader of the acoustic guitar track may change colors from green to red to indicate the overriding of the automation in live mode. In some implementations, the user interface include a single button that brings the music editing and playback system back to automation mode.

In some implementations, the user interface displays individual undo buttons for each parameter that is adjusted in an automation. As a simple example, in FIG. 1D, an undo button is displayed in top right corner of the fader for the drums track. By clicking the undo button, the fader of the drums track is removed from the automation and the fader for the drums track would return to the level it was in the timeline waveform prior to the automation. As a more complex example, in FIG. 2C, undo buttons are displayed by the faders for the drums, percussion, loop, and bass tracks. By clicking the undo button for the bass track, the fader of the bass track is removed from the automation and the fader for the bass track would return to the level it was in the timeline waveform prior to the automation. In this manner, a user can remove one adjustment from an automation instead of having to delete the whole automation.

In some implementations, the user interface allows the user to copy an automation and paste it somewhere else in a song. For example, if a user likes an automation that executes over a transition, the user can copy the automation and paste it in a chorus section of the song to apply those setting to the chorus section as well.

The music editing and playback system may include a pad the plays underneath the song. The pad may include, for example, keyboard sounds that drone in the background. As a real-world example, the pad can include soft music that plays before a religious leader gets up to start preaching right before a band starts. The pad can be used for transitions between songs. For example, when the tracks of a song fade out, the pad continues to play until the next song starts. In some implementations, the music editing and playback system include two audio engines, one for playing tracks and one for playing the pad. The user interface, illustrated for example in FIG. 1A, includes a button labelled "PAD" that allows to user to adjust settings for pad. The user can turn the pad on or off. Further, the user can change the volume of the pad and the key of the pad (e.g., A, C, or A-flat). Any or all of the pad settings can be adjusted in an automation. For example, an automation positioned at the end of a song may adjust the pad to change keys from the key of the song to a different key. In some implementations, by default, the music editing and payback system sets the key of the pad to match the key of the song that is currently playing.

MIDI (Musical Instrument Digital Interface) is a technical standard that describes a communications protocol, digital interface, and electrical connectors that connect a wide variety of electronic musical instruments, computers, and related audio devices for playing, editing, and recording music. Playback can be considered as the brains of a production hub. Thus, the music playing in playback can, for example, control lights, and control projected lyrics. MIDI points can be added to the timeline waveform to execute external changes at specific timecodes. For example, MIDI points can be used to set stage lights to green during a chorus section of a song and to red during the verse sections of the song. As illustrated in FIG. 1A, the user interface includes a button labelled "MUTE MIDI" that pauses MIDI communication to all other devices. For example, when mute MIDI is active, the lights and projected lyrics do not change. The mute MIDI can be toggled on or off in an automation. For example, during a specific service, a user may want the stage lights to remain the same during a chorus section of a song. In this situation, a first automation can be added at the start of the chorus section to activate the mute MIDI and a second automation can be added at the end of the chorus section to deactivate the mute MIDI. In this manner, MIDI points can be temporarily ignored without having to delete MIDI points and then recreate them later.

In some implementations, automations can be used to jump to a different point in a song or a specific point in another song. For example, a first automation at a first timecode may be set to jump to a second automation at a second timecode. Further, jump-based automations can be used to overcome some current technical limitations with editing songs. For example, as illustrated in FIG. 1A, the timeline waveform includes visual representations delineating and identifying different sections of the currently-selected song. The music editing and playback system allows the user to alter the order of the different sections. For example, in FIG. 1A, the user can drag the verse section to occur between the two chorus sections. In some implementations, the decision of which portions of the song are chorus, verse, bridge, etc. are predetermined and cannot be changed by the end-user. However, the end-user may want to shorten a portion of a song. For example, a user may only want to play the first half of a chorus section. Enabling splitting of song portions in current editing systems can interfere with the operation of existing structural components. Thus, jump-based automations can be used to shorten a portion of a song without interfering with existing structural components.

As described above, the music editing and playback system allows the user to alter the order of the different sections of a song. In addition, the music editing and playback system allows the user to add or remove sections to a song. For example, with reference to FIG. 1E, the user can add a new verse section before the two chorus sections. In some implementations, automations are coupled to a specific section of a song. Thus, if a section is added or removed to the song, the timecode(s) of the automations are adjusted to stay coupled with their section. For example, back to FIG. 1E, assume that Automation 1 is positioned to execute twenty seconds after the start of a verse section. If the user adds a new chorus section before the verse section including Automation 1, the music editing and playback system shifts the position of the verse section to the right on the timeline waveform. Further, the music editing and playback system shifts the timecode of Automation 1 such that it still executes twenty seconds after the start of the verse section. In this manner, the user can add and remove sections to a song without having to manually adjust automations to account for the changes.

Figure 3:
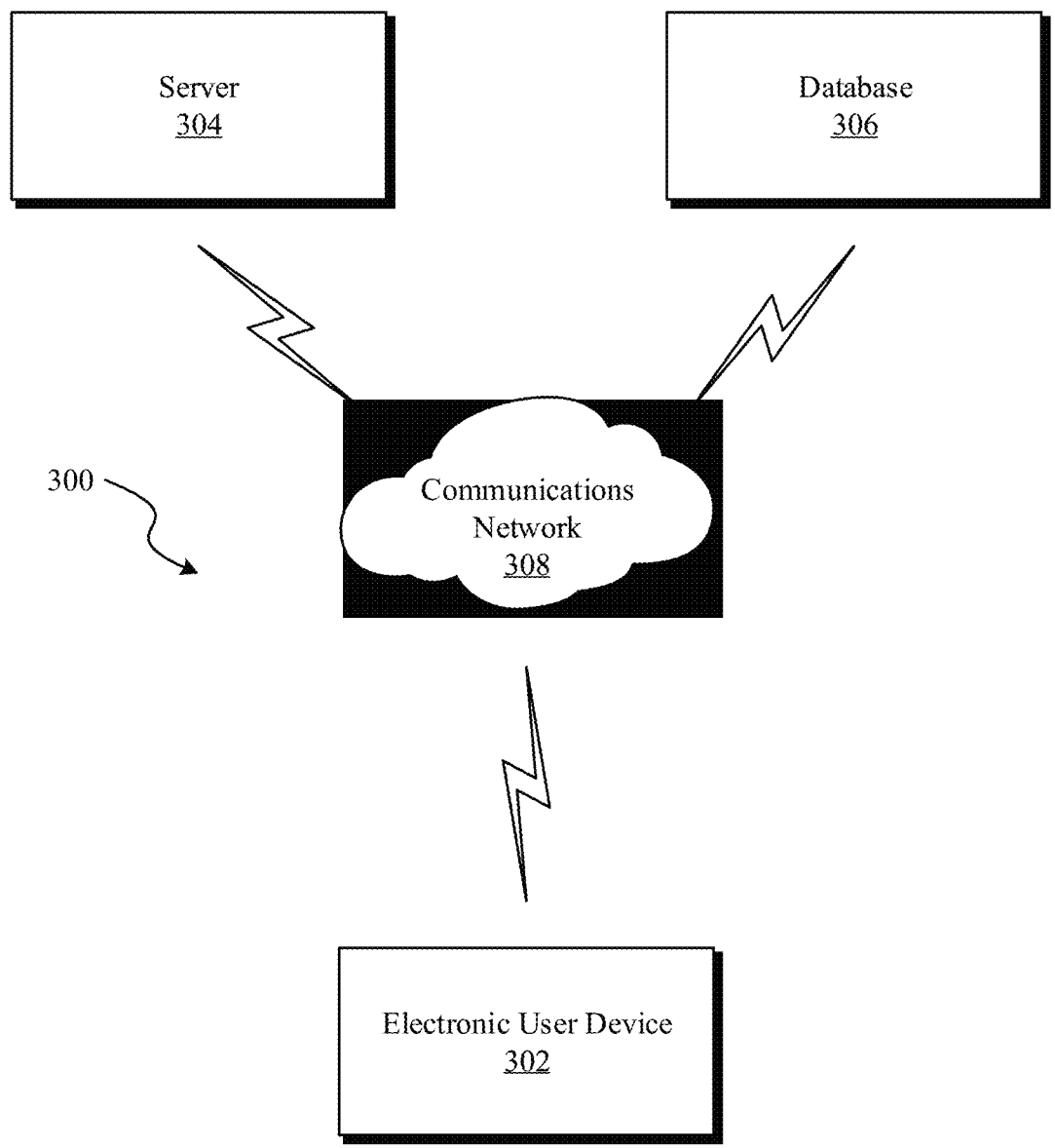
FIG. 3 is a block diagram of an example of a system for music editing and playback, in accordance with some implementations of the present disclosure.

FIG. 3 is a block diagram of an example of a system 300 for music editing and playback. The system 300 illustrated in FIG. 3 includes an electronic user device 302, a server 304, a database 306, and a communications network 308. The system 300 may include fewer, additional, or different components in different configurations than the system 300 illustrated in FIG. 3. For example, in some implementations, the system 300 may include multiple electronic user devices. The electronic user device 302 may include a smartphone, a tablet, a laptop computer, a desktop computer, or a combination thereof. The communication network 308 may be a wired network, a wireless network, or both. All or parts of the communication network 308 may be implemented using various networks, for example, a cellular network, the Internet, a Bluetooth™ network, a wireless local area network (e.g., Wi-Fi), a wireless accessory Personal Area Networks (PAN), cable, an Ethernet network, satellite, a machine-to-machine (M2M) autonomous network, and a public switched telephone network. The electronic user device 302, the server 304, and the other various components of the system 300 communicate with each other over the communication network 308 using suitable wireless or wired communication protocols. In some implementations, communications with other external devices (not shown) occur over the communication network 308.

Figure 4:
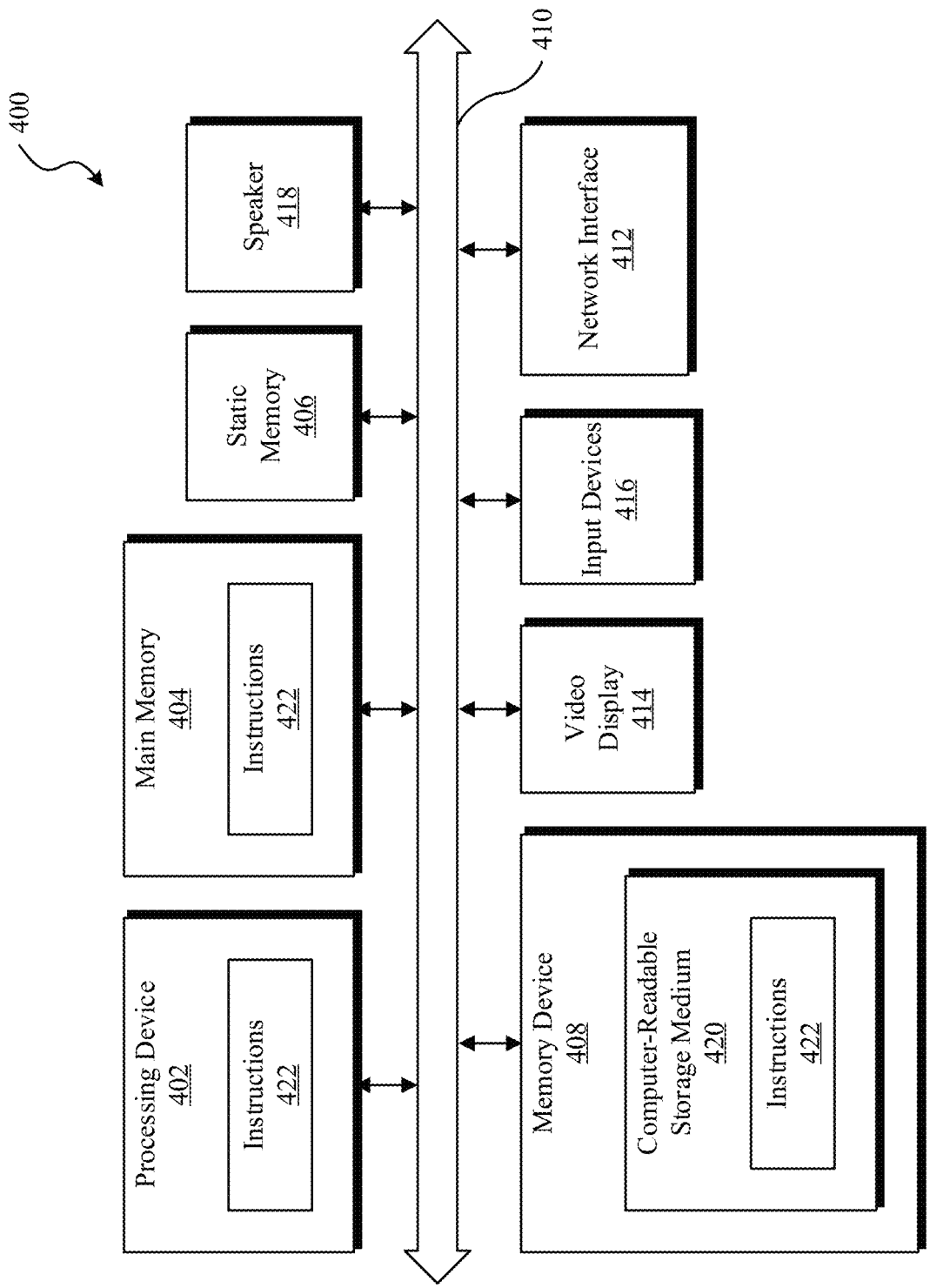
FIG. 4 is a block diagram of an example of a computer system, in accordance with some implementations of the present disclosure.

FIG. 4 is a block diagram of an example of a computer system 400. The computer system 400 may be connected (e.g., networked) to other computer systems in a LAN, an intranet, an extranet, or the Internet, including via the cloud or a peer-to-peer network. The computer system 400 may operate in the capacity of the electronic user device 302, the server 304, and/or the database 306 of the system 300 illustrated in FIG. 3. The computer system 840 may be a personal computer (PC), a tablet computer, a wearable (e.g., wristband), a set-top box (STB), a personal Digital Assistant (PDA), a mobile phone, a smartphone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 400 illustrated in FIG. 4 includes a processing device 402, a main memory 404 (e.g., read-only memory (ROM), flash memory, solid state drives (SSDs), dynamic random access memory (DRAM) such as synchronous DRAM (SDRAM)), a static memory 406 (e.g., flash memory, solid state drives (SSDs), static random access memory (SRAM)), and a memory device 408, which communicate with each other via a bus 410.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a system on a chip, a field programmable gate array (FPGA), a digital signal processor (DSP), network processor, or the like. The processing device 402 may be configured to execute instructions for performing any of the operations and steps discussed herein.

The computer system 400 illustrated in FIG. 4 further includes a network interface device 412. The computer system 400 also may include a video display 414 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), input devices 416 (e.g., a keyboard and/or a mouse or a gaming-like control), and one or more speakers 418 (e.g., a speaker). In one illustrative example, the video display 414 and the input devices 416 may be combined into a single component or device (e.g., an LCD touch screen).

The memory device 408 may include a computer-readable storage medium 820 on which the instructions 422 embodying any one or more of the methods, operations, or functions described herein is stored. The instructions 422 may also reside, completely or at least partially, within the main memory 404 and/or within the processing device 402 during execution thereof by the computer system 400. As such, the main memory 404 and the processing device 402 also constitute computer-readable media. The instructions 422 may further be transmitted or received over a network via the network interface device 812.

While the computer-readable storage medium 420 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods described herein may be performed by processing logic that may include hardware (circuitry, dedicated logic, etc.), software (such as is run on a general-purpose computer system, a dedicated machine, or a computing device of any kind (e.g., IoT node, wearable, smartphone, mobile device, etc.)), or a combination of both. The methods described herein and/or each of their individual functions (including "methods," as used in object-oriented programming), routines, subroutines, or operations may be performed by one or more processors of a computing device (e.g., any component of FIG. 3, such as the server 304). In certain implementations, the methods described herein may be performed by a single processing thread. Alternatively, the methods described herein may be performed by two or more processing threads, wherein each thread implements one or more individual functions, routines, subroutines, or operations of the methods described herein.

Figure 5:
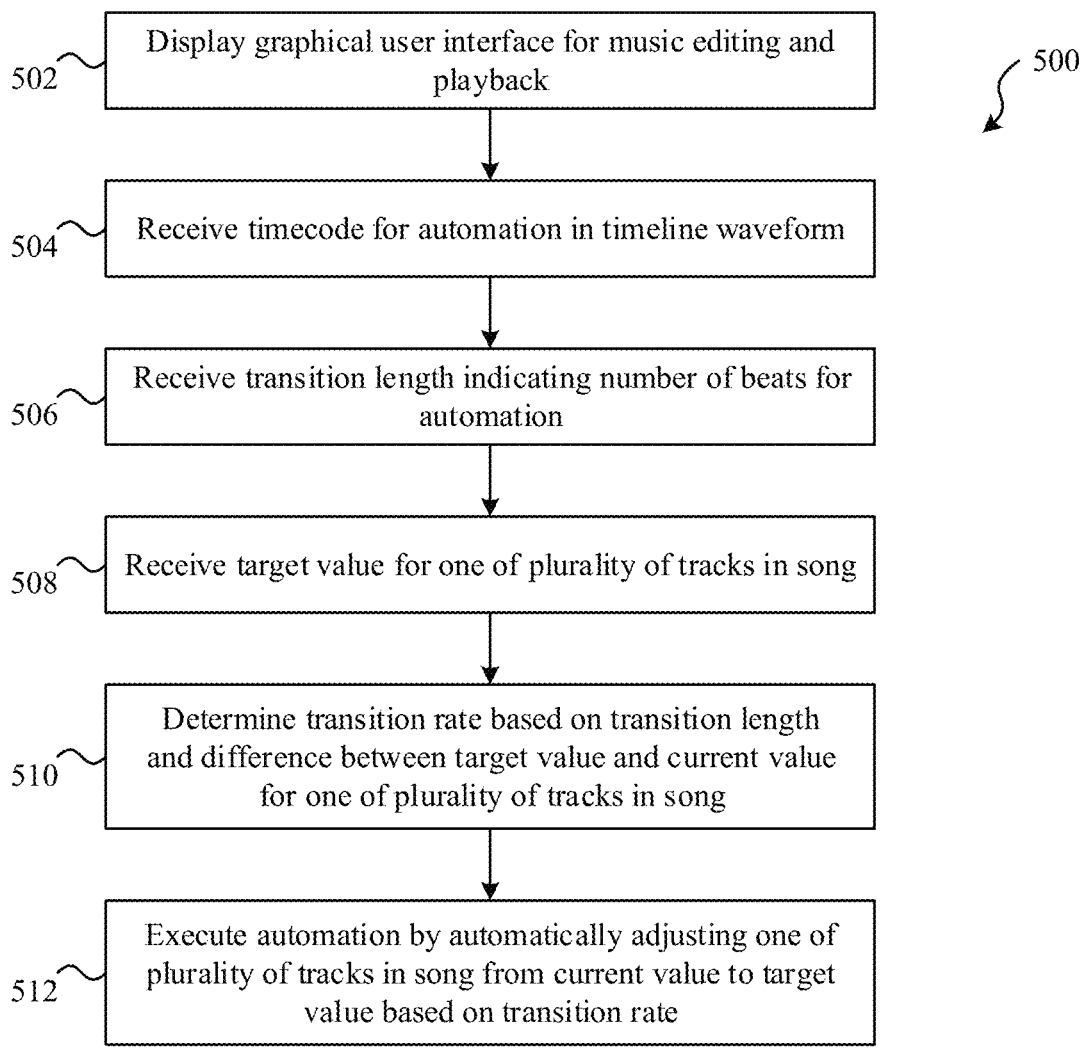
FIG. 5 is a flow diagram of an example of a method for automating track adjustments for live music performance, in accordance with some implementations of the present disclosure.

FIG. 5 is a flow diagram of an example of a method 500 for auto-reporting public music performances. The method 500 is performed by processing logic that may include hardware (circuitry, dedicated logic, etc.), software (such as is run on a general-purpose computer system, a dedicated machine, or a computing device of any kind (e.g., IoT node, wearable, smartphone, mobile device, etc.)), or a combination of both. The method 500 and/or each of its individual functions (including "methods," as used in object-oriented programming), routines, subroutines, or operations may be performed by one or more processors of a computing device (e.g., any component of FIG. 4, as described above). In certain implementations, the method 500 may be performed by a single processing thread. Alternatively, the method 500 may be performed by two or more processing threads, wherein each thread implements one or more individual functions, routines, subroutines, or operations of the method 500.

For simplicity of explanation, the method 500 is depicted in FIG. 5 and described as a series of operations. However, operations in accordance with the present disclosure can occur in various orders and/or concurrently, and/or with other operations not presented and described herein. For example, the operations depicted in the method 500 in FIG. 5 may occur in combination with any other operation of any other method disclosed herein. Furthermore, not all illustrated operations may be required to implement the method 500 in accordance with the disclosed subject matter. In addition, those skilled in the art will understand and appreciate that the method 500 could alternatively be represented via a state diagram or event diagram as a series of interrelated states.

At block 502, a graphical user interface for music editing and playback is displayed. For example, the video display 414 of the computer system 400 may display the user interface illustrated in FIG. 1A. At block 504, a timecode for an automation in a timeline waveform is received. For example, a user may shift a timeline waveform until a play head is positioned at the part of the song where the user wants the automation to occur. Then, the user may clicks a plus button on the play head, as illustrated in FIG. 1B. At block 506, a transition length indicating a number of beats for the automation is received. For example, a user may select a transition length using the pop-up automation menu described above in relation to FIGS. 1B and 2A. At block 508, a target value for one of the plurality of tracks in the song is received. For example, a user may move a fader in the graphical user interface for one of the plurality of tracks in a song as described above in relations to FIGS. 1D and 2C. Alternatively, or in addition, a user may turn a knob or press a button in a graphical user interface to set a target value for one of the plurality of tracks in a song. At block 510, a transition rate is determined based on the transition length and a difference between the target value and a current value for the one of the plurality of tracks in the song. For example, the processing device 402 may determine a transition rate to adjust a fader during the transition length so that the fader completes its transition from its current value to the target value at the end of the transition length. As a specific example, when the transition length is five beats and the difference between the target and current values for a percussion track is 50%, the transition rate may be set to 10% per beat. At block 512, the automation is executed by automatically adjusting the one of the plurality of tracks in the song from the current value to the target value based on the transition rate. For example, when the target value for a piano track is 40%, the transition length is four beats, and the current value of the piano track is 80%, the fader for the piano track may be reduced by 10% for beat for a total of four beats.

Any reference herein to a specific type or genre of music or songs is not intended to be limiting. The systems and methods disclosed herein may be implemented with any type or genre of music or songs. Further, any reference herein to a specific type of location, audience, and/or occasion for a live music performance is not intended to be limiting. The systems and methods disclosed herein may be implemented in any type of location, with any type of audience, and for any type of occasion.

Consistent with the above disclosure, the examples of systems and methods enumerated in the following clauses are specifically contemplated and are intended as a non-limiting set of examples.

Clause 1. A method for automating track adjustments for live music performance, the method comprising:
 displaying a graphical user interface for music editing and playback including:
  a timeline waveform of a song including a plurality of tracks, and
  a plurality of control elements configured to control the plurality of tracks in the song;
 receiving, via the graphical user interface, a timecode for an automation in the timeline waveform;
 receiving, via the graphical user interface, a transition length indicating a number of beats for the automation;
 receiving, from one of the plurality of control elements, a target value for one of the plurality of tracks in the song;
 determining a transition rate based on the transition length and a difference between the target value and a current value for the one of the plurality of tracks in the song; and
 upon reaching the timecode during playback of the song, executing the automation by automatically adjusting the one of the plurality of tracks in the song from the current value to the target value based on the transition rate.

Clause 2. The method of any clause herein, wherein the plurality of tracks in the song include at least one selected from the group consisting of a click track, a guide track, an instrumental track, a drums track, a bass track, a loop track, a percussion track, and a piano track.

Clause 3. The method of any clause herein, wherein the graphical user interface further includes a control button for disabling musical instrument digital interface (MIDI) communication, and wherein the automation is further executed by automatically disabling the MIDI communication.

Clause 4. The method of any clause herein, wherein the plurality of control elements is a first plurality of control elements, wherein the graphical user interface further includes a second plurality of control elements configured to control a key of a pad that plays underneath the song, wherein the method further comprises receiving a target key for the pad from one of the second plurality of control elements, and wherein the automation is further executed by automatically adjusting the pad to play the target key.

Clause 5. The method of any clause herein, wherein the automation is a first automation, wherein the timecode is a first timecode, and wherein the method further comprising:
 upon reaching a second timecode of a second automation during the playback of the song, executing the second automation by automatically jumping the playback to the first timecode.

Clause 6. The method of any clause herein, further comprising:
 altering visual appearances of at least a subset of the plurality of control elements to indicate at least a subset of the plurality of tracks in the song that are adjustable.

Clause 7. The method of any clause herein, wherein the timecode is a first timecode for a starting point of the automation, wherein the timeline waveform includes a plurality of visual representations delineating and identifying a plurality of sections of the song, and wherein the method further comprising:
 adjusting a second timecode for a starting point of one of the plurality of sections of the song, wherein the first timecode for the starting point of the automation is included in the one of the plurality of sections of the song; and
 responsive to adjusting the second timecode, adjusting the first timecode for the starting point of the automation such that a constant time distance between the first timecode and the second timecode is maintained.

Clause 8. The method of any clause herein, wherein the timecode is a first timecode for a starting point of the automation, and wherein the method further comprises:

determining a second timecode for an ending point of the automation based on the first timecode and the transition length; and storing the first timecode, the second timecode, and the transition rate in a memory.

Clause 9. A system for automating track adjustments for live music performance, the system comprising:
- a display device configured to display a graphical user interface for music editing and playback including:
  - a timeline waveform of a song including a plurality of tracks, and
  - a plurality of control elements configured to control the plurality of tracks in the song;
- one or more memory devices for storing instructions; and
- one or more processing devices configured to execute the instructions to:
  - receive, via the graphical user interface, a timecode for an automation in the timeline waveform,
  - receive, via the graphical user interface, a transition length indicating a number of beats for the automation,
  - receive, from one of the plurality of control elements, a target value for one of the plurality of tracks in the song,
  - determine a transition rate based on the transition length and a difference between the target value and a current value for the one of the plurality of tracks in the song, and
  - upon reaching the timecode during playback of the song, execute the automation by automatically adjusting the one of the plurality of tracks in the song from the current value to the target value based on the transition rate.

Clause 10. The system of any clause herein, wherein the plurality of tracks in the song include at least one selected from the group consisting of a click track, a guide track, an instrumental track, a drums track, a bass track, a loop track, a percussion track, and a piano track.

Clause 11. The system of any clause herein, wherein the graphical user interface further includes a control button for disabling musical instrument digital interface (MIDI) communication, and wherein, to execute the automation, the one or more processing devices are further configured to automatically disable the MIDI communication.

Clause 12. The system of any clause herein, wherein the plurality of control elements is a first plurality of control elements, wherein the graphical user interface further includes a second plurality of control elements configured to control a key of a pad that plays underneath the song, wherein the one or more processing devices are further configured to execute the instructions to receive a target key for the pad from one of the second plurality of control elements, and wherein, to execute the automation, the one or more processing devices are further configured to automatically adjust the pad to play the target key.

Clause 13. The system of any clause herein, wherein the automation is a first automation, wherein the timecode is a first timecode, and wherein the one or more processing devices are further configured to execute the instructions to:
- upon reaching a second timecode of a second automation during the playback of the song, execute the second automation by automatically jumping the playback to the first timecode.

Clause 14. The system of any clause herein, wherein the one or more processing devices are further configured to execute the instructions to:
- alter visual appearances of at least a subset of the plurality of control elements to indicate at least a subset of the plurality of tracks in the song that are adjustable.

Clause 15. The system of any clause herein, wherein the timecode is a first timecode for a starting point of the automation, wherein the timeline waveform includes a plurality of visual representations delineating and identifying a plurality of sections of the song, and wherein the one or more processing devices are further configured to execute the instructions to:
- adjust a second timecode for a starting point of one of the plurality of sections of the song, wherein the first timecode for the starting point of the automation is included in the one of the plurality of sections of the song, and
- response to adjusting the second timecode, adjust the first timecode for the starting point of the automation such that a constant time distance between the first timecode and the second timecode is maintained.

Clause 16. The system of any clause herein, wherein the timecode is a first timecode for a starting point of the automation, and wherein the one or more processing devices are further configured to execute the instructions to:
- determine a second timecode for an ending point of the automation based on the first timecode and the transition length, and
- store the first timecode, the second timecode, and the transition rate in at least one of the one or more memory devices.

Clause 17. A system for automating track adjustments for live music performance, the system comprises:
- a display device configured to display a graphical user interface for music editing and playback including:
  - a timeline waveform of a song including at least a first track and a second track,
  - a first control element configured to control the first track in the song, and
  - a second control element configured to control the second track in the song;
- one or more memory devices for storing instructions; and
- one or more processing devices configured to execute the instructions to:
  - receive, via the graphical user interface, a timecode for an automation in the timeline waveform,
  - receive, via the graphical user interface, a transition length indicating a number of beats for the automation,
  - receive, from the first control element, a first target value for a first transition of the first track in the song,
  - receive, from the second control element, a second target value for a second transition of the second track in the song,
  - determine a first transition rate based on the transition length and a first difference between the first target value and a first current value for the first track in the song,
  - determining a second transition rate based on the transition length and a second difference between the second target value and a second current value for the second track in the song, and
  - upon reaching the timecode during playback of the song, execute the automation by:
    - automatically adjusting the first track in the song from the first current value to the first target value based on the first transition rate, and automatically adjusting the second track in the song from the second current value to the second target value based on the second transition rate.

Clause 18. The system of any clause herein, wherein the one or more processing devices are further configured to execute the instructions to:
  display, on the graphical user interface, a first undo button positioned proximate to the first control element,
  display, on the graphical user interface, a second undo button positioned proximate to the second control element,
  receive a user selection of the first undo button, and
  responsive to receiving the user selection of the first undo button, remove the first transition from the automation.

Clause 19. The system of any clause herein, wherein the one or more processing devices are further configured to execute the instructions to:
  responsive to receiving the first transition, display, on the graphical user interface, a visual indication positioned proximate to the first control element, the visual indication indicating that the first track in the song has been adjusted, and
  responsive to receiving the user selection of the first undo button, remove the visual indication from the graphical user interface.

Clause 20. The system of any clause herein, wherein the graphical user interface further includes a third control element for adjusting a third track in the song, and wherein the one or more processing devices are further configured to execute the instructions to receive, from the third control element, a command to mute the third track in the song, and wherein, to execute the automation, the one or more processing devices are further configured to execute the instructions to mute the third track at the timecode during the playback of the song.

For simplicity of explanation, the methods described herein are depicted and described as a series of operations. However, operations in accordance with this disclosure can occur in various orders and/or concurrently, and/or with other operations not presented and described herein. For example, the operations depicted in one method described herein may occur in combination with any other operation of any other method disclosed herein. Furthermore, not all illustrated operations may be required to implement the methods described herein in accordance with the disclosed subject matter. In addition, those skilled in the art will understand and appreciate that the methods described herein could alternatively be represented via a state diagram or event diagram as a series of interrelated states.

The foregoing description, for purposes of explanation, use specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various implementations of the present disclosure. Once the above disclosure is fully appreciated, numerous variations and modifications will become apparent to those skilled in the art.

What is claimed is:

1. A method for automating track adjustments for live music performance, the method comprising:
  displaying a graphical user interface for music editing and playback including:
    a timeline waveform of a song including a plurality of tracks, and
    a plurality of control elements configured to control the plurality of tracks in the song;
  receiving, via the graphical user interface, a timecode for an automation in the timeline waveform;
  receiving, via the graphical user interface, a transition length including a number of beats over which the automation will execute;
  receiving, from one of the plurality of control elements, a target value for one of the plurality of tracks in the song;
  determining a transition rate based on the transition length and a difference between the target value and a current value for the one of the plurality of tracks in the song; and
  upon reaching the timecode during playback of the song, executing the automation by automatically adjusting the one of the plurality of tracks in the song from the current value to the target value based on the transition rate.

2. The method of claim 1, wherein the plurality of tracks in the song include at least one selected from the group consisting of a click track, a guide track, an instrumental track, a drums track, a bass track, a loop track, a percussion track, and a piano track.

3. The method of claim 1, wherein the graphical user interface further includes a control button for disabling musical instrument digital interface (MIDI) communication, and wherein the automation is further executed by automatically disabling the MIDI communication.

4. The method of claim 1, wherein the plurality of control elements is a first plurality of control elements, wherein the graphical user interface further includes a second plurality of control elements configured to control a key of a pad that plays underneath the song, wherein the method further comprises receiving a target key for the pad from one of the second plurality of control elements, and wherein the automation is further executed by automatically adjusting the pad to play the target key.

5. The method of claim 1, wherein the automation is a first automation, wherein the timecode is a first timecode, and wherein the method further comprising:
  upon reaching a second timecode of a second automation during the playback of the song, executing the second automation by automatically jumping the playback to the first timecode.

6. The method of claim 1, further comprising:
  altering visual appearances of at least a subset of the plurality of control elements to indicate at least a subset of the plurality of tracks in the song that are adjustable.

7. The method of claim 1, wherein the timecode is a first timecode for a starting point of the automation, wherein the timeline waveform includes a plurality of visual representations delineating and identifying a plurality of sections of the song, and wherein the method further comprising:
  adjusting a second timecode for a starting point of one of the plurality of sections of the song, wherein the first timecode for the starting point of the automation is included in the one of the plurality of sections of the song; and responsive to adjusting the second timecode, adjusting the first timecode for the starting point of the automation such that a constant time distance between the first timecode and the second timecode is maintained.

8. The method of claim 1, wherein the timecode is a first timecode for a starting point of the automation, and wherein the method further comprises:
determining a second timecode for an ending point of the automation based on the first timecode and the transition length; and
storing the first timecode, the second timecode, and the transition rate in a memory.

9. The method of claim 1, wherein automatically adjusting the one of the plurality of tracks in the song from the current value to the target value based on the transition rate further includes automatically adjusting a volume of the one of the plurality of tracks in the song from the current value to the target value based on the transition rate.

10. The method of claim 9, wherein the transition rate is less than a difference between the target value and the current value for the volume of the one of the plurality of tracks in the song.

11. The method of claim 1, further comprising:
disabling musical instrument digital interface (MIDI) communication prior to reaching the timecode during playback of the song,
wherein the MIDI communication kept disabled at least until after the automation is executed.

12. A system for automating track adjustments for live music performance, the system comprising:
a display device configured to display a graphical user interface for music editing and playback including:
a timeline waveform of a song including a plurality of tracks, and
a plurality of control elements configured to control the plurality of tracks in the song;
one or more memory devices for storing instructions; and
one or more processing devices configured to execute the instructions to:
receive, via the graphical user interface, a timecode for an automation in the timeline waveform,
receive, via the graphical user interface, a transition length including a number of beats over which the automation will execute,
receive, from one of the plurality of control elements, a target value for one of the plurality of tracks in the song,
determine a transition rate based on the transition length and a difference between the target value and a current value for the one of the plurality of tracks in the song, and
upon reaching the timecode during playback of the song, execute the automation by automatically adjusting the one of the plurality of tracks in the song from the current value to the target value based on the transition rate.

13. The system of claim 12, wherein the plurality of tracks in the song include at least one selected from the group consisting of a click track, a guide track, an instrumental track, a drums track, a bass track, a loop track, a percussion track, and a piano track.

14. The system of claim 12, wherein the graphical user interface further includes a control button for disabling musical instrument digital interface (MIDI) communication, and wherein, to execute the automation, the one or more processing devices are further configured to automatically disable the MIDI communication.

15. The system of claim 12, wherein the plurality of control elements is a first plurality of control elements, wherein the graphical user interface further includes a second plurality of control elements configured to control a key of a pad that plays underneath the song, wherein the one or more processing devices are further configured to execute the instructions to receive a target key for the pad from one of the second plurality of control elements, and wherein, to execute the automation, the one or more processing devices are further configured to automatically adjust the pad to play the target key.

16. The system of claim 12, wherein the automation is a first automation, wherein the timecode is a first timecode, and wherein the one or more processing devices are further configured to execute the instructions to:
upon reaching a second timecode of a second automation during the playback of the song, execute the second automation by automatically jumping the playback to the first timecode.

17. The system of claim 12, wherein the one or more processing devices are further configured to execute the instructions to:
alter visual appearances of at least a subset of the plurality of control elements to indicate at least a subset of the plurality of tracks in the song that are adjustable.

18. The system of claim 12, wherein the timecode is a first timecode for a starting point of the automation, wherein the timeline waveform includes a plurality of visual representations delineating and identifying a plurality of sections of the song, and wherein the one or more processing devices are further configured to execute the instructions to:
adjust a second timecode for a starting point of one of the plurality of sections of the song, wherein the first timecode for the starting point of the automation is included in the one of the plurality of sections of the song, and
response to adjusting the second timecode, adjust the first timecode for the starting point of the automation such that a constant time distance between the first timecode and the second timecode is maintained.

19. The system of claim 12, wherein the timecode is a first timecode for a starting point of the automation, and wherein the one or more processing devices are further configured to execute the instructions to:
determine a second timecode for an ending point of the automation based on the first timecode and the transition length, and
store the first timecode, the second timecode, and the transition rate in at least one of the one or more memory devices.

20. A system for automating track adjustments for live music performance, the system comprises:
a display device configured to display a graphical user interface for music editing and playback including:
a timeline waveform of a song including at least a first track and a second track,
a first control element configured to control the first track in the song, and
a second control element configured to control the second track in the song;
one or more memory devices for storing instructions; and
one or more processing devices configured to execute the instructions to:
receive, via the graphical user interface, a timecode for an automation in the timeline waveform, receive, via the graphical user interface, a transition length including a number of beats over which the automation will execute, receive, from the first control element, a first target value for a first transition of the first track in the song, receive, from the second control element, a second target value for a second transition of the second track in the song, determine a first transition rate based on the transition length and a first difference between the first target value and a first current value for the first track in the song, determining a second transition rate based on the transition length and a second difference between the second target value and a second current value for the second track in the song, and upon reaching the timecode during playback of the song, execute the automation by:

automatically adjusting the first track in the song from the first current value to the first target value based on the first transition rate, and automatically adjusting the second track in the song from the second current value to the second target value based on the second transition rate.

21. The system of claim 20, wherein the one or more processing devices are further configured to execute the instructions to:

display, on the graphical user interface, a first undo button that at least partially overlaps the first control element, display, on the graphical user interface, a second undo button that at least partially overlaps the second control element, receive a user selection of the first undo button, and responsive to receiving the user selection of the first undo button, remove the first transition from the automation.

22. The system of claim 21, wherein the one or more processing devices are further configured to execute the instructions to:

responsive to receiving the first transition, display, on the graphical user interface, a visual indication that at least partially overlaps the first control element, the visual indication indicating that the first track in the song has been adjusted, and responsive to receiving the user selection of the first undo button, remove the visual indication from the graphical user interface.

23. The system of claim 20, wherein the graphical user interface further includes a third control element for adjusting a third track in the song, and wherein the one or more processing devices are further configured to execute the instructions to receive, from the third control element, a command to mute the third track in the song, and wherein, to execute the automation, the one or more processing devices are further configured to execute the instructions to mute the third track at the timecode during the playback of the song.

* * * * *